US008543464B2

(12) United States Patent
Asai

(10) Patent No.: US 8,543,464 B2
(45) Date of Patent: Sep. 24, 2013

(54) COMPUTER READABLE MEDIUM FOR OUTPUTTING INFORMATION, AND INFORMATION PROCESSOR AND IMAGE FORMING DEVICE USING THE SAME

(75) Inventor: Norihiko Asai, Gifu (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 924 days.

(21) Appl. No.: 12/687,994

(22) Filed: Jan. 15, 2010

(65) Prior Publication Data

US 2010/0177351 A1 Jul. 15, 2010

(30) Foreign Application Priority Data

Jan. 15, 2009 (JP) ................................. 2009-006617

(51) Int. Cl.
*G06Q 30/00* (2012.01)
(52) U.S. Cl.
USPC ........................................................ 705/26.1
(58) Field of Classification Search
USPC ........................................................ 705/26.1
See application file for complete search history.

(56) References Cited

U.S. PATENT DOCUMENTS

2003/0058297 A1* 3/2003 Saruta .............................. 347/19

FOREIGN PATENT DOCUMENTS

JP 2003-91665 3/2003
JP 2003-195698 7/2003

* cited by examiner

*Primary Examiner* — Mila Airapetian
(74) *Attorney, Agent, or Firm* — Scully, Scott, Murphy & Presser, PC

(57) ABSTRACT

A computer readable medium has computer readable instructions stored thereon. The instructions, when executed by a processor communicable with an image forming device, cause the processor to perform the steps of transmitting, to a first server connected with the processor via a network, a request for supply of an expendable item for the image forming device, acquiring a first identification for identifying the expendable item to be supplied via the first server, which first identification is transmitted by the first server in response to the request, storing the first identification acquired, onto a database, acquiring a second identification for identifying an expendable item attached to the image forming device, determining whether the second identification acquired is identical to a first identification stored on the database, and outputting first information when it is determined that the second identification is different from any first identification stored on the database.

19 Claims, 6 Drawing Sheets

COMPUTER READABLE MEDIUM FOR OUTPUTTING INFORMATION, AND INFORMATION PROCESSOR AND IMAGE FORMING DEVICE USING THE SAME

CROSS-REFERENCE TO RELATED APPLICATION

This application claims priority under 35 U.S.C. §119 from Japanese Patent Application No. 2009-006617 filed on Jan. 15, 2009. The entire subject matter of the application is incorporated herein by reference.

BACKGROUND

1. Technical Field

The following description relates to one or more techniques for outputting predetermined information concerning an image forming device.

2. Related Art

A number of techniques have been proposed for outputting a predetermined kind of information regarding an image forming device. For example, one of the proposed techniques is adapted to determine whether a cartridge installed in an image forming device is new. In addition, when the cartridge is new, a sheet attached to the cartridge is scanned by a scanner, and it is determined whether a trademark and an expendable item code extracted from the scanned image data are proper. Further, it is determined whether a serial number extracted from the scanned image data is for a new cartridge. When there is a problem in any of the trademark, the expendable item code, and the serial number, the technique makes a user apprised of information that the cartridge is not genuine and forbids a printing operation.

SUMMARY

However, it is unfortunate that the aforementioned technique places on the user such an extra burden that the user has to scan the sheet with the scanner.

Aspects of the present invention are advantageous to provide one or more improved techniques that make it possible to output predetermined information regarding an image forming device without having to increase user's efforts.

According to aspects of the present invention, a computer readable medium is provided which has computer readable instructions stored thereon. When executed by a processor communicable with an image forming device, the instructions cause the processor to perform the steps of transmitting, to a first server connected with the processor via a network, a request for supply of an expendable item for the image forming device, acquiring a first identification for identifying the expendable item to be supplied via the first server, which first identification is transmitted by the first server in response to the request, storing the first identification acquired, onto a database, acquiring a second identification for identifying an expendable item attached to the image forming device, determining whether the second identification acquired is identical to a first identification stored on the database, and outputting first information when it is determined that the second identification is different from any first identification stored on the database.

In some aspects of the present invention, when the second identification is different from any first identification stored on the database, i.e., when the expendable item attached to the image forming device is not an expendable item supplied via the first server, it is possible to output the first information.

The first information may include predetermined contents concerning the image forming device.

According to aspects of the present invention, further provided is an information processor communicable with an image forming device. The information processor includes an expendable requesting unit configured to transmit, to a first server connected with the information processor via a network, a request for supply of an expendable item for the image forming device, a first-identification acquiring unit configured to acquire a first identification for identifying the expendable item to be supplied via the first server, which first identification is transmitted by the first server in response to the request, a first-identification storing unit configured to store the first identification acquired, onto a database, a second-identification acquiring unit configured to acquire a second identification for identifying an expendable item attached to the image forming device, a first identification determining unit configured to determine whether the second identification acquired is identical to a first identification stored on the database, and a first-information outputting unit configured to output first information when the first identification determining unit determines that the second identification is different from any first identification stored on the database.

According to aspects of the present invention, further provided is an image forming device, which includes an expendable requesting unit configured to transmit, to a first server connected with the image forming device via a network, a request for supply of an expendable item for the image forming device, a first-identification acquiring unit configured to acquire a first identification for identifying the expendable item to be supplied via the first server, which first identification is transmitted by the first server in response to the request, a first-identification storing unit configured to store the first identification acquired, onto a database, a second-identification acquiring unit configured to acquire a second identification that identifies an expendable item attached to the image forming device, a first identification determining unit configured to determine whether the second identification acquired is identical to a first identification stored on the database, and a first-information outputting unit configured to output first information when the first identification determining unit determines that the second identification is different from any first identification stored on the database.

BRIEF DESCRIPTION OF THE ACCOMPANYING DRAWINGS

Figure 3:
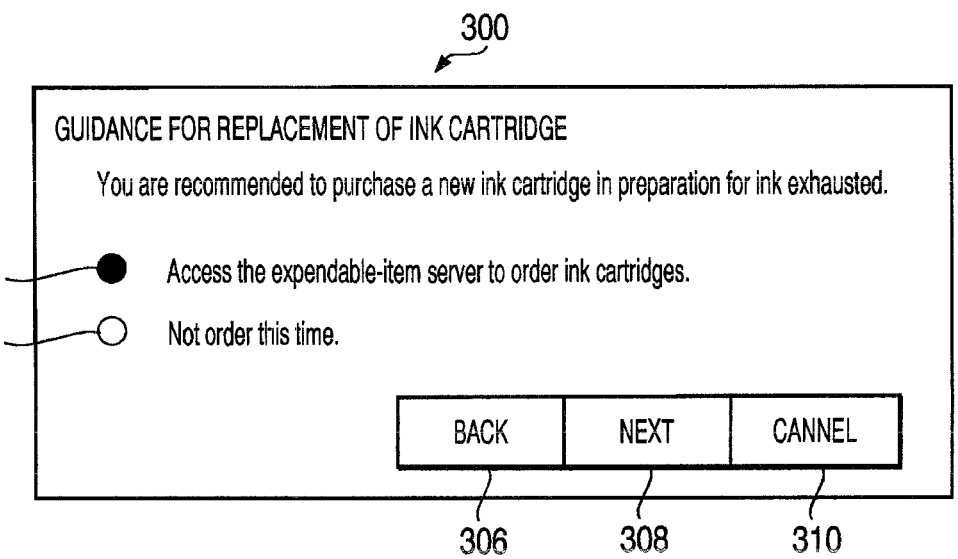

FIG. 3 exemplifies an ink cartridge ordering screen in the embodiment according to one or more aspects of the present invention.

Figure 4:
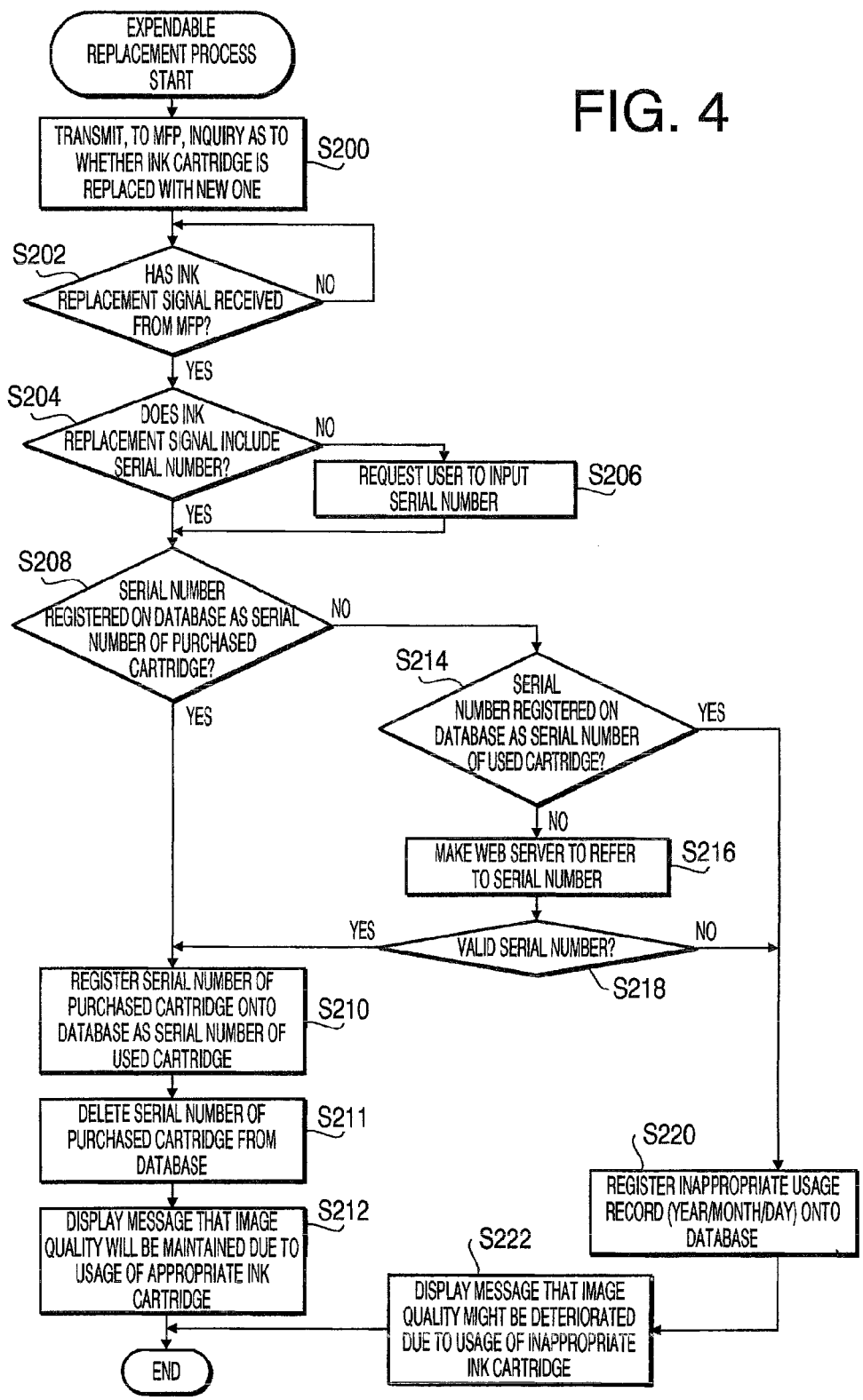

FIG. 4 is a flowchart showing a procedure of an expendable replacement process in the embodiment according to one or more aspects of the present invention.

Figure 5:
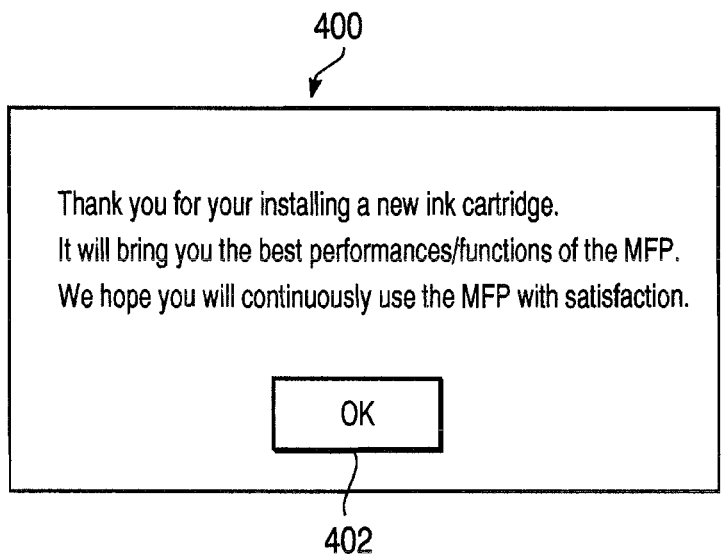

FIG. 5 exemplifies a dialog box, to be displayed in the expendable replacement process, which contains a message showing gratitude for a new ink cartridge appropriately purchased, and a message informing that print quality will thereby be maintained in the embodiment according to one or more aspects of the present invention.

Figure 6:
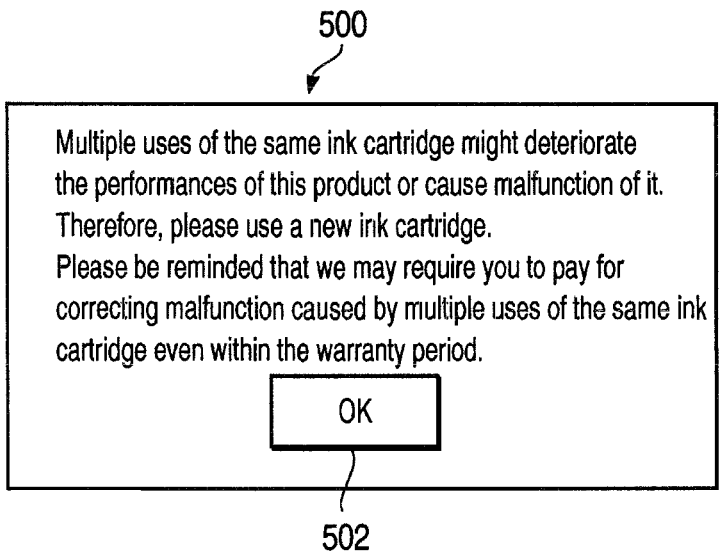

FIG. 6 exemplifies a dialog box, to be displayed in the expendable replacement process, which contains a message warning that print quality might be deteriorated due to usage of an inappropriate ink cartridge in the embodiment according to one or more aspects of the present invention.

Figure 7:
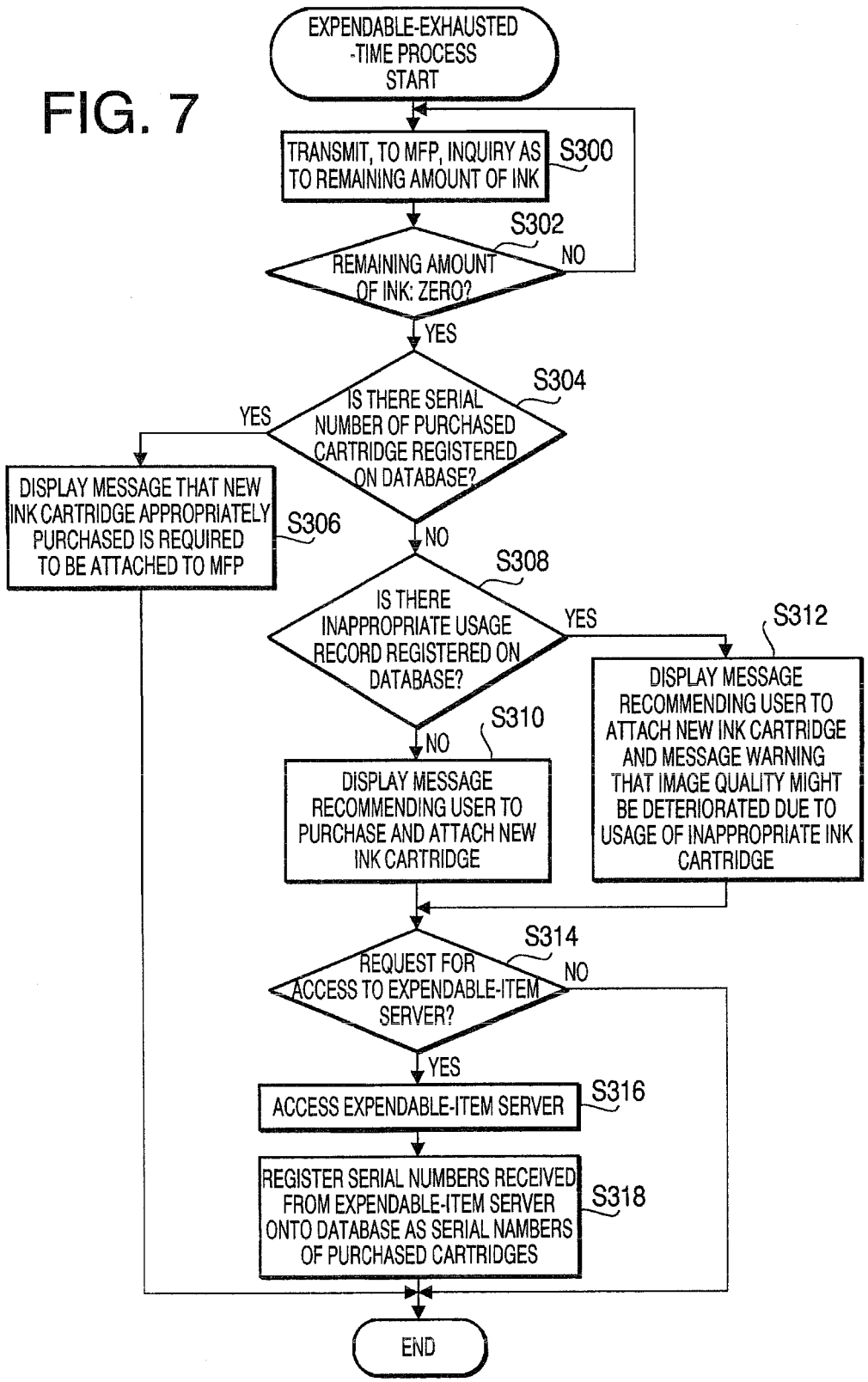

FIG. 7 is a flowchart showing a procedure of an expendable-exhausted-time process in the poster printing process in the embodiment according to one or more aspects of the present invention.

Figure 8A:
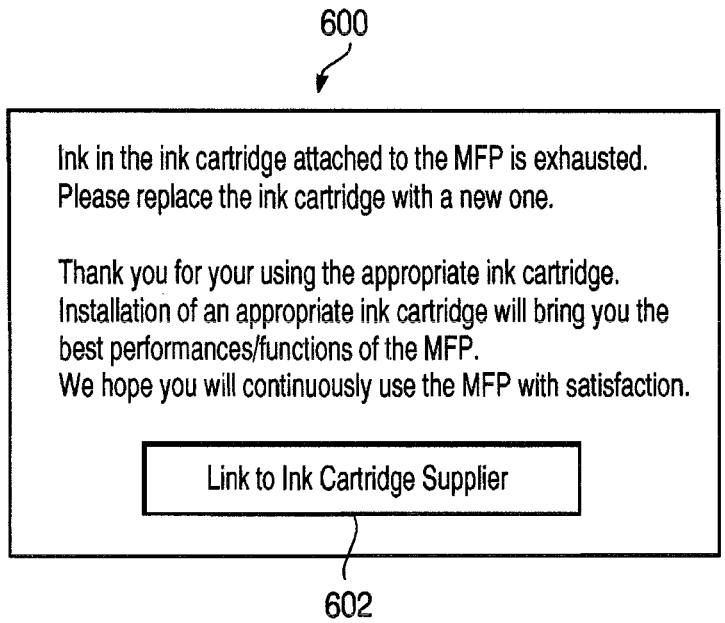

FIG. 8A exemplifies a dialog box, to be displayed in the expendable-exhausted-time process, which contains a message informing that ink stored in a current ink cartridge is exhausted and a new ink cartridge is required to be installed in the embodiment according to one or more aspects of the present invention.

Figure 8B:
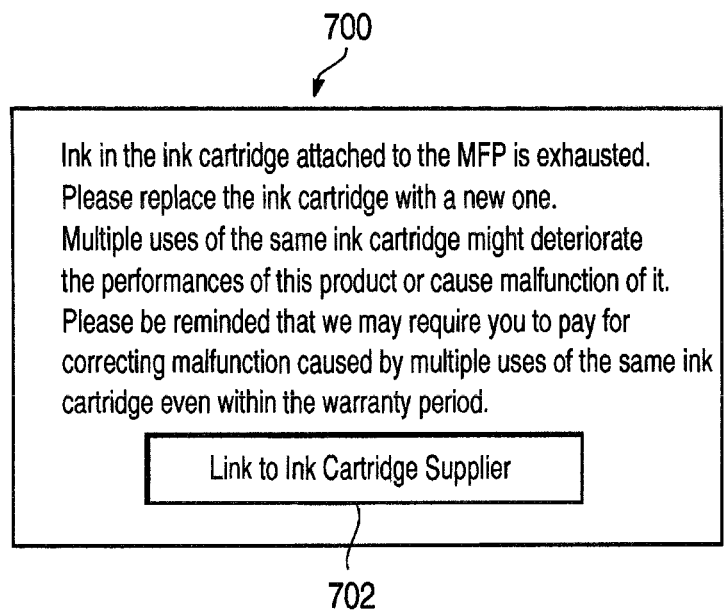

FIG. 8B exemplifies a dialog box, to be displayed in the expendable-exhausted-time process, which contains a message informing that ink stored in a current ink cartridge is exhausted and a new ink cartridge is required to be installed, and a message warning that print quality might be deteriorated due to usage of an inappropriate ink cartridge in the embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an embodiment according to aspects of the present invention will be described with reference to the accompany drawings.

(Configuration of System)

Figure 1:
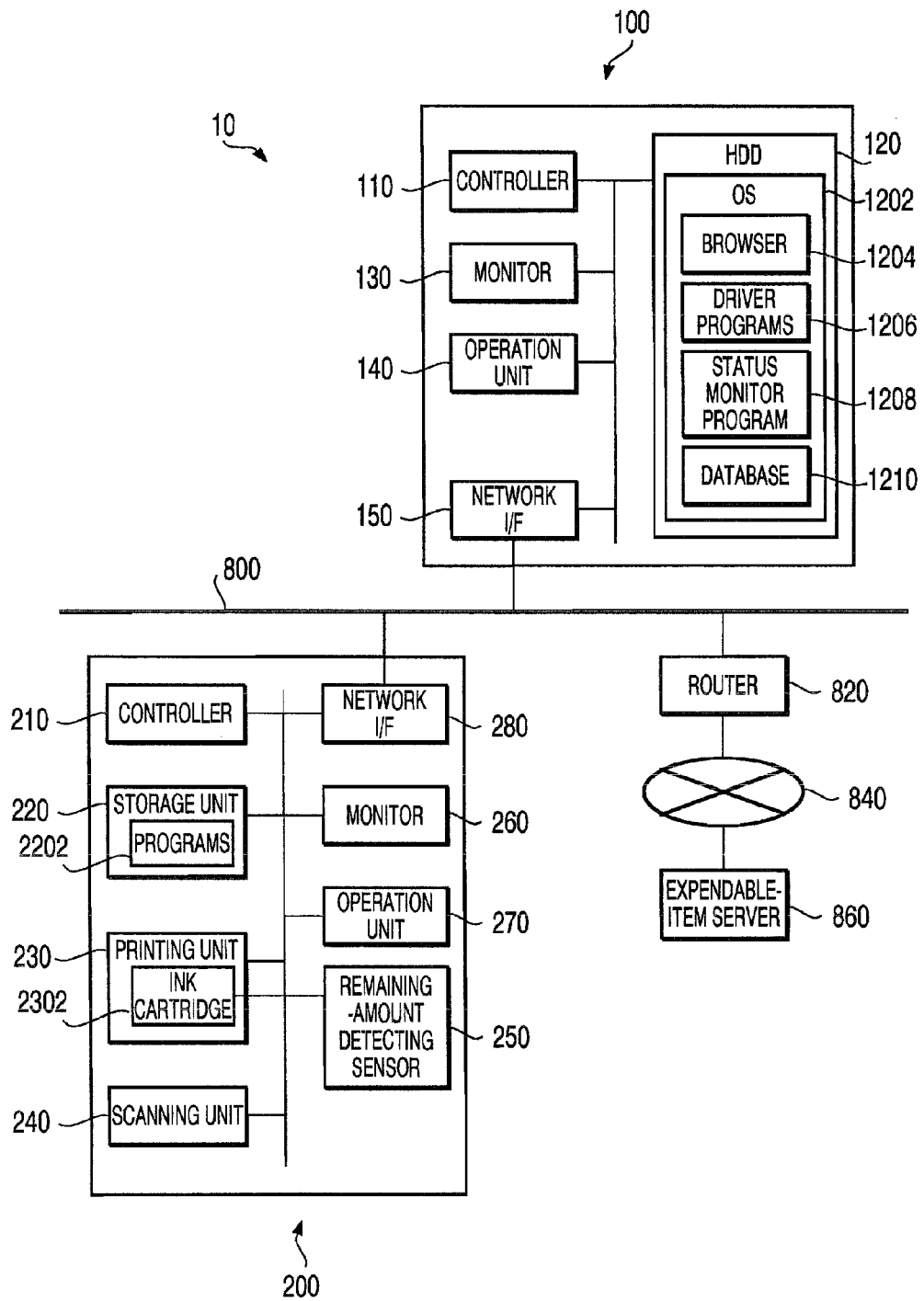
FIG. 1 is a block diagram schematically showing an overall configuration of a printing system in an embodiment according to one or more aspects of the present invention.

As illustrated in FIG. 1, a printing system 10 in an embodiment includes a personal computer (PC) 100, an inkjet-type multi-function peripheral (MFP) 200, and a network device (not shown), which are communicably connected with each other via a local area network (LAN) 800. The MFP 200 is configured to receive print data from the PC 100 and perform a printing operation based on the print data received. In addition, the MFP 200 performs a scanning operation to create scanned data in response to a scanning request from the PC 100, and transmits the scanned data to the PC 100 via the LAN 800.

In addition, the LAN 800 is connected with an Internet 840 via a router 820. On the Internet 840, there is an expendable-item server 860 that sells an ink cartridge 2302 to be attached to the MFP 200 and other expendable supplies.

Initially, a configuration of the MFP 200 will be set forth. The MFP 200 includes a controller 210 configured to take control of the MFP 200, and a storage unit 220 that stores thereon programs 2202 for executing predetermined processes. Further, the MFP 200 includes a printing unit 230 configured to perform a printing operation based on print data, a scanning unit 240 configured to scan a document placed on a document loading portion (not shown), and a remaining-amount detecting sensor 250 configured to detect an amount of ink remaining in an ink cartridge 2302. Moreover, the MFP 200 includes a monitor 260 configured to display various kinds of information, an operation unit 270 that serves as an interface to accept inputs of data (or commands) to be transmitted to the MFP 200, and a network interface (network I/F) 280. The controller 210 is configured with a CPU that performs arithmetic processing, a ROM that stores various programs thereon, and a RAM that serves as a work area. The storage unit 220 is configured, for instance, with a non-volatile memory (e.g., an EEPROM) or a hard disk drive (HDD). The printing unit 230, which includes the ink cartridge 2302, is configured to discharge droplets of ink from a head.

The CPU of the controller 210 performs various processes by executing, on the RAM, programs stored on the ROM and the storage unit 220. For example, the CPU of the controller 210 performs a printing operation based on print data received by the network I/F 280. Additionally, the CPU of the controller 210 transmits, to the PC 100 via the network I/F 280, data showing a remaining amount of ink in the ink cartridge 2302 that is detected by the remaining-amount detecting sensor 250. The CPU of the controller 210 accesses data on the RAM to perform the processes. Accordingly, the CPU of the controller 210 achieves various functions when performing the various processes by executing, on the RAM, the various programs stored on the ROM and the storage unit 220.

Subsequently, a configuration of the PC 100 will be described. The PC 100 includes a controller 110 that takes overall control of the PC 100, and a hard disk drive (HDD) 120. Further, the PC 100 includes a monitor 130, an operation unit 140 configured with a keyboard and/or a mouse, and a network I/F 150 configured to be connected with the LAN 800.

The controller 110 is configured with a CPU that performs arithmetic processing, a ROM that stores various programs thereon, and a RAM that serves as a work area. The HDD 120 stores thereon an operating system (OS) 1202, and various kinds of application software such as a browser program 1204 (hereinafter, simply referred to as a "browser 1204") for browsing web pages on the Internet 840. Further, the HDD 120 stores thereon driver programs, such as a printer driver for controlling the printing unit 230 of the MFP 200 and a scanner driver for controlling the scanning unit 240 of the MFP 200. Moreover, the HDD 120 stores thereon a status monitor program 1208 for monitoring a remaining amount of ink in the ink cartridge 2302 attached to the MFP 200 and displaying on the monitor 130 the remaining amount of ink, and a database 1210 (e.g., a registry that the OS 1202 offers) for managing setting data for the OS 1202, the browser 1204, the driver programs 1206, and the status monitor program 1208.

By, on the RAM, running the various programs stored on the ROM and executing the OS 1202 and the various programs 1204-1208 based on the database 1210 stored on the HDD 120, the CPU of the controller 110 performs various processes to achieve various functions. Next, detailed explanations will be given about processes to be attained by the controller 110, with reference to FIGS. 2 to 8. It is noted that the following descriptions will be provided to take, as an example of expendable supplies, the ink cartridge 2302 attached to the MFP 200.

(Expendable Purchasing Process)

Figure 2:
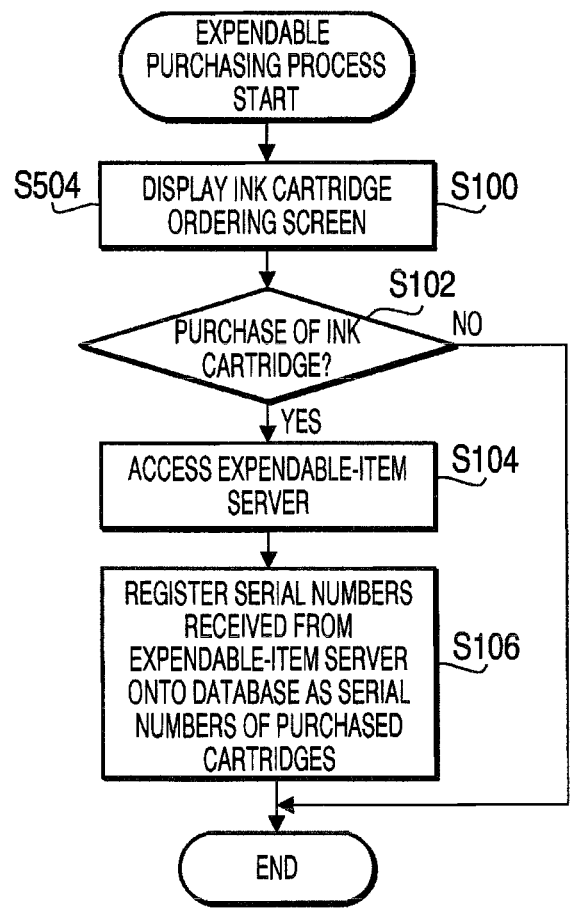
FIG. 2 is a flowchart showing a procedure of an expendable purchasing process in the embodiment according to one or more aspects of the present invention.

An expendable purchasing process, shown in FIG. 2, is executed, for instance, in a process of installing into the HDD 120 the driver programs 1206 and the status monitor program 1208. It is noted that FIG. 2 is provided in a form that steps for installing the driver programs 1206 or the status monitor program 1208 are omitted.

In the expendable purchasing process, the controller 110 initially displays on the monitor 130 an ink cartridge ordering screen 300 (see FIG. 3) for ordering expendable supplies (S100). The ink cartridge ordering screen 300 shows a message thereon recommending a user to purchase a new ink cartridge in preparation for exhaustion of ink stored in the ink cartridge 2302. Further, the ink cartridge ordering screen 300 includes a check box 302 to be selected for accessing the expendable-item server 860 and advancing a procedure of purchasing an ink cartridge in response to the message, and a check box 304 to be selected for ending the procedure of purchasing an ink cartridge. In addition, the ink cartridge ordering screen 300 includes a "Back" button 306 for inputting an instruction to return to a predetermined process executed in a process of installing the driver programs 1206 or the like, a "Next" button 308 for inputting an instruction to advance to a process responsive to the selection between the check boxes 302 and 304, and a "Cancel" button 310 for inputting an instruction to terminate the expendable purchasing process. It is noted that, in the embodiment, when any of the check boxes 302 and 304 is not selected, the "Next" button 308 is set into a grayout state where the "Next" button 308 cannot be pressed.

When the user selects one of the check boxes 302 and 304 via the operation unit 140 in response to the ink cartridge ordering screen 300 being displayed in S100, and presses the "Next" button 308, the controller 110 determines which is selected between the check boxes 302 and 304 (whether the check box 302 is selected) (S102). Incidentally, when the user presses the "Back" button 306 via the operation unit 140, the controller 110 goes to a predetermined process. Further, when the user presses the "Cancel" button 310 via the operation unit 140, the controller 110 terminates the expendable purchasing process.

When determining in S102 that the check box 304 is selected (S102: No), the controller 110 terminates the expendable purchasing process, without executing a below-mentioned step S106. Accordingly, an identifier that allows the user to identify each ink cartridge 2302 (specifically, a serial number attached to each ink cartridge 2302) is not registered on the database 1210. Meanwhile, when determining in S102 that the check box 302 is selected (S102: Yes), the controller 110 performs a process of accessing the expendable-item server 860 of a predetermined address on the Internet 840 (S104).

A concrete explanation will be provided about the operations to be executed by the controller 110 in S104. The controller 110 first launches the browser 1204 stored on the HDD 120, and then access the expendable-item server 860 based on a previously-stored uniform resource locator (URL) of the expendable-item server 860. Subsequently, the controller 110 receives predetermined data from the expendable-item server 860, and displays on the monitor 130 a screen based on the received data. Thereafter, the controller 110 accepts, via the operation unit 140, user inputs for specifying a model name (model number) of the ink cartridge 2302 and a purchase number of cartridges. After acquiring the model name (model number) of the ink cartridge 2302 and the purchase number of cartridges that the user inputs through the operation unit 140, the controller 110 takes control of the network I/F 150 and transmits, to the expendable-item server 860, data (a request for serial numbers) that contains the acquired model name (model number) and purchase number. After that, the controller 110 receives serial number(s) of ink cartridge(s) 2302 as a return from the expendable-item server 860 in response to the request.

After executing S104, the controller 110 registers the serial numbers received in S104 onto the database 1210 as serial numbers of purchased ink cartridges (S106). Then, the controller 110 terminates the expendable purchasing process. It is noted that the serial numbers, which are received in S104 and registered onto the database 1210 in S106, are serial numbers attached to ink cartridges 2302 that are to be sent to the user (purchaser) in a predetermined fashion.

(Expendable Replacement Process)

An expendable replacement process, shown in FIG. 4, is based on the status monitor program 1208 for monitoring the printing unit 230 which program is installed along with the printer driver included in the driver programs 1206. When the PC 100 is powered on, the controller 110 launches the OS 1202 and runs the status monitor program 1208 for monitoring the printing unit 230.

After receiving data representing that ink stored in the ink cartridge 2302 is almost exhausted (the remaining amount of ink is substantially zero) in a below-mentioned expendable-exhausted-time process (see FIG. 7), the controller 110 initially takes control of the network I/F 150 at predetermined timing to transmit to the MFP 200 an inquiry as to whether the ink cartridge 2302 is replaced with a new ink cartridge 2302 (S200). Then, the controller 110 determines whether the controller 110 has received an ink replacement signal transmitted by the MFP 200 in response to the inquiry issued in S200 (S202). When determining that the controller 110 has not received an ink replacement signal from the MFP 200 (S202: No), the controller 110 waits until receiving an ink replacement signal. Meanwhile, when determining that the controller 110 has received an ink replacement signal from the MFP 200 (S202: Yes), the controller 110 goes to S204.

In S204, the controller 110 determines whether the ink replacement signal includes a serial number of the newly-installed ink cartridge 2302 (S204). When determining that the ink replacement signal includes the serial number of the newly-installed ink cartridge 2302 (S204: Yes), the controller 110 stores, on the RAM thereof, the serial number included in the ink replacement signal, and thereafter goes to S208. Meanwhile, when determining that the ink replacement signal does not include the serial number of the newly-installed ink cartridge 2302 (S204: No), the controller 110 displays on the monitor 130 an input screen for accepting an input of a serial number, and stores on the RAM a serial number input on the input screen through the operation unit 140 (S206). Then, the controller 110 goes to S208. The process in S206 is preferred to apply, for instance, when the controller 210 of the MFP 200 cannot acquire the serial number of the newly-installed ink cartridge 2302 or make the ink replacement signal include the serial number.

In S208, the controller 110 determines whether the serial number stored on the RAM in S204 or S206 is identical to one of the serial numbers of the purchased cartridges that are registered on the database 1210, namely, whether a serial number identical to the serial number stored on the RAM is registered on the database 1210 as one of the serial numbers of the purchased cartridges (S208). When determining that a serial number identical to the serial number stored on the RAM is registered on the database 1210 as one of the serial numbers of the purchased cartridges (S208: Yes), the controller 110 registers the serial number of the purchased cartridge onto the database 1210 as a serial number of a used cartridge (S210). In addition, the controller 110 deletes the processed serial number of the purchased cartridge from the database 1210 (S211). Then, the controller 110 displays on the monitor 130 a dialog box 400 (see FIG. 5) that shows messages regarding ink cartridge replacement (S212). The dialog box 400 contains a message showing gratitude for the newly-installed ink cartridge 2302 purchased via the expendable-item server 860, a message informing that print quality will thereby be maintained, and an "OK" button 402. When the "OK" button 402 is pressed, the controller 110 terminates the expendable replacement process.

Meanwhile, when determining that a serial number identical to the serial number stored on the RAM is not registered on the database 1210 as one of the serial numbers of the purchased cartridges (S208: No), the controller 110 goes to S214. In S214, the controller 110 determines whether the serial number stored on the RAM in S204 or S206 is identical to one of serial numbers of used cartridges that are registered on the database 1210, namely, whether a serial number identical to the serial number stored on the RAM is registered on the database 1210 (has already been registered onto the database 1210 in a past operation of S210) as one of serial numbers of used cartridges (S214). When determining that a serial number identical to the serial number stored on the RAM is not registered on the database 1210 as one of serial numbers of used cartridges (S214: No), the controller 110 goes to S216. Meanwhile, when determining that a serial number identical to the serial number stored on the RAM is registered on the database 1210 as one of serial numbers of used cartridges (S214: Yes), the controller 110 goes to S220.

In S216, the controller 110 takes control of the network I/F 150 and transmits the serial number on the RAM to a predetermined Web server (e.g., the expendable-item server 860) on the Internet 840 (S216). Here, the controller 110 receives validity information representing whether the serial number transmitted is valid or invalid. It is noted that the process in S216 applies when the user does not purchase any ink cartridge 2302 in S104 of the expendable purchasing process shown in FIG. 2, and purchases a suitable ink cartridge 2302, for instance, in a general merchandising store. Subsequently, the controller 110 determines whether the validity information represents that the serial number transmitted is valid, namely, whether the received validity information is valid (S218). When determining that the validity information represents that the serial number transmitted is valid (S218: Yes), the controller 110 goes to S210 and performs the aforementioned step S212 after execution of S210. Meanwhile, when determining that the validity information represents that the serial number transmitted is invalid (S218: No), the controller 110 goes to S220.

In S220, the controller 110 registers, onto the database 1210, an inappropriate-usage record representing that the ink cartridge 2302, identified by a serial number registered on the RAM, is invalid (inappropriate) (S220). It is noted that the inappropriate-usage record includes the serial number attached to the ink cartridge 2302 and date (year/month/day) information registered in association with each other. For example, When it is determined that the ink cartridge 2302 is reused with ink being refilled therein (in such a case, the controller 110 makes an affirmative determination in S214 (S214: Yes)), an inappropriate-usage record is registered onto the database 1210. After execution of S220, the controller 110 displays on the monitor 130 a dialog box 500 (see FIG. 6) that shows messages regarding ink cartridge replacement (S222). The dialog box 500 contains a message warning that print quality might be deteriorated due to usage of an inappropriate ink cartridge, and an "OK" button 502. When confirming the message, the user presses the "OK" button 502 via the operation unit 140. When the "OK" button 502 is pressed, the controller 110 terminates the extendable replacement process.

(Extendable-Exhausted-Time Process)

An extendable-exhausted-time process, shown in FIG. 7, is based on the status monitor program 1208, in the same manner as the aforementioned expendable replacement process.

Initially, after launching the status monitor program 1208, the controller 110 takes control of the network I/F 150 at predetermined timing to transmit to the MFP 200 an inquiry as to the remaining amount of ink stored in the ink cartridge 2302. Then, the controller 110 receives data representing the remaining amount of ink transmitted by the MFP 200 in response to the inquiry (S300). The controller 110 stores the received data onto the RAM, and goes to S302.

In S302, the controller 110 determines whether the remaining amount of ink, represented by the data received in S300, is substantially zero (no ink remains) (S302). When determining that the remaining amount of ink is not substantially zero (some ink remains) (S302: No), the controller 110 goes back to S300, and re-executes S300 at predetermined timing. Meanwhile, when determining that the remaining amount of ink is substantially zero (S302: Yes), the controller 110 determines whether a serial number of purchased cartridge is registered on the database 1210 (S304). When determining that a serial number of purchased cartridge is registered on the database 1210 (S304: Yes), the controller 110 displays on the monitor 130 messages informing that the remaining amount of ink stored in the ink cartridge 2302 is substantially zero, a new ink cartridge 2302 purchased via the expendable-item server 860 is required to be attached to the MFP 200, and print quality can be maintained due to usage of an appropriate ink cartridge 2302 (S306). After that, the controller 110 terminates the expendable-exhausted-time process.

Meanwhile, when determining that a serial number of purchased cartridge is not registered on the database 1210 (S304: No), the controller 110 determines whether an inappropriate-usage record is registered on the database 1210 (S308). When determining that an inappropriate-usage record is not registered on the database 1210 (S308: No), the controller 110 displays on the monitor 130 a dialog box 600 (see FIG. 8A) that contains a message informing that the remaining amount of ink is substantially zero and a new ink cartridge 2302 is required to be attached to the MFP 200, a message showing gratitude for the appropriate ink cartridge 2302 having been attached, and a message advising that attachment of an appropriate ink cartridge 2302 will bring the best performances/ functions of the MFP 200 (S310). When determining that an inappropriate-usage record is registered on the database 1210 (S308: Yes), the controller 110 displays on the monitor 130 a dialog box 700 (see FIG. 8B) that contains a message informing that the remaining amount of ink is substantially zero and a new ink cartridge 2302 is required to be attached to the MFP 200, a message warning that usage of an inappropriate ink cartridge might cause malfunction of the MFP 200, and a message recommending the user to attach an appropriate ink cartridge 2302 to the MFP 200 (S312).

As shown in FIGS. 8A and 8B, the dialog boxes 600 and 700 respectively include link buttons 602 and 702 to be pressed for accessing the expendable-item server 860 on the Internet 840. The link buttons 602 and 702 are associated with the URL of the expendable-item server 860. When detecting the link button 602 or 702 being pressed, the controller 110 launches the browser 1204 stored on the HDD 120 to access the expendable-item server 860.

After execution of S310 or S312, the controller 110 subsequently determines whether the user has selected purchasing an ink cartridge 2302 via the expendable-item server 860 in response to the message introducing the expendable-item server 860 displayed on the monitor 130 in S310 or S312, namely whether the user has input a request for access to the expendable-item server 860 (by pressing the link button 602 or 702) via the operation unit 140 (S314). When determining that the user has input a request for access to the expendable-item server 860 (S314: Yes), the controller 110 executes S316 and S308. It is noted that S316 and S318 are the same as S104 and S106 of the expendable purchasing process shown in FIG. 2, respectively, and therefore detailed explanations of S316 and S318 will be omitted. Meanwhile, when determining that the user has not input a request for access to the expendable-item server 860 (S314: No), or after executing S318, the controller 110 terminates the expendable-exhausted-time process.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible.

In the aforementioned embodiment, the PC 100 (specifically, the controller 110) is configured to convey information by displaying on the monitor 130 dialog boxes each of which contains various messages. Nevertheless, for instance, the PC 100 may be configured to convey information using sound. Further, the PC 100 may be configured to convey information to a predetermined device connected communicably with the PC 100. Furthermore, the PC 100 may be configured to convey information by printing it with the printing unit 230. Moreover, the PC 100 may be configured to convey information in a method which combines at least two of display of a dialog box, output of sound, transmission of the information to a predetermined device, and printing of the information.

In the aforementioned embodiment, ink as an image forming agent is stored in the ink cartridge 2302. However, an ink container may be configured integrally with an inkjet head included in the inkjet-type printing unit 230. In this case, when ink is exhausted, the ink container integrated with the inkjet head may be replaced as a whole.

In the aforementioned embodiment, the MFP 200 has the inkjet-type printing unit 230. However, the MFP 200 may have an electrophotographic printing unit that uses toner as an image forming agent. In this case, toner may be stored in a toner cartridge, and the toner cartridge may be attached to the MFP 200. Further, the remaining-amount detecting sensor 250 may detect a remaining amount of toner. Alternatively, the MFP 200 may have a thermal-transfer printing unit 230 that uses an ink-ribbon. In this case, the ink-ribbon may be stored in an ink-ribbon cartridge as an image forming agent. Further, the remaining-amount detecting sensor 250 may detect a remaining amount of the ink-ribbon.

In the aforementioned embodiment, the ink cartridge 2302 is taken as an example of expendable supplies. However, an expendable item may be a lamp included in the scanning unit 240.

In the aforementioned embodiment, each of the processes is executed by the controller 110 of the PC 100. However, each of the processes may be executed by the controller 210 of the MFP 200. In this case, the MFP 200 may store on the storage unit 220 a database independent from the OS 1202, store a program for each of the processes on the ROM of the controller 210 or the storage unit 220, and execute the stored program.

The processes to be executed in the aforementioned embodiment have been set forth based on FIGS. 2, 4, and 7, respectively. Here, each step of the processes may be omitted as needed. For example, under an assumption that an appropriate ink cartridge 2302 can be purchased only via the expendable-item server 860, when the controller 110 makes a negative determination in S208 (S208: No), the controller 110 may go directly to S220 without executing S214 to S218. Alternatively, when making a negative determination in S208 (S208: No), the controller 110 may go directly to S222, or directly to S216 without executing S214. It is noted that when S214 is omitted, S210 is as well omitted. Further, when the controller 110 makes an affirmative determination in S208 (S208: Yes), the controller 110 may go directly to S212 without executing S210. Additionally, when the controller 110 makes an affirmative determination in S208 (S208: Yes), the controller 110 may not necessarily execute S212. Furthermore, in the expendable-exhausted-time process shown in FIG. 8, S304 may be omitted.

What is claimed is:

1. A non-transitory computer readable medium having computer readable instructions stored thereon, the instructions, when executed by a processor communicable with an image forming device, causing the processor to perform:
   an expendable requesting step of transmitting, to a first server connected with the processor via a network, a request for supply of an expendable item for the image forming device;
   a first-identification acquiring step of acquiring a first identification for identifying the expendable item to be supplied via the first server, which first identification is transmitted by the first server in response to the request;
   a first-identification storing step of storing the first identification acquired, onto a database;
   a second-identification acquiring step of acquiring a second identification for identifying an expendable item attached to the image forming device;
   a first identification determining step of determining whether the second identification acquired is identical to a first identification stored on the database; and
   a first-information outputting step of outputting first information when it is determined in the first identification determining step that the second identification is different from any first identification stored on the database.

2. The non-transitory computer readable medium according to claim 1,
   wherein the instructions cause the processor to further perform:
   a second-identification transmitting step of, when it is determined in the first identification determining step that the second identification is different from any first identification stored on the database, transmitting the second identification to a second server on the network;
   a validity information acquiring step of acquiring validity information of the second identification from the second server in response to transmission of the second identification; and a validity determining step of determining based on the validity information acquired whether the second identification is valid, and wherein the first-information outputting step comprises a step of outputting the first information when it is determined in the validity determining step that the second identification is invalid.

3. The non-transitory computer readable medium according to claim 1, wherein the instructions cause the processor to further perform:

an invalid-identification storing step of, when it is determined in the first identification determining step that the second identification is different from any first identification stored on the database, storing the second identification onto the database as an invalid identification.

4. The non-transitory computer readable medium according to claim 3, wherein the instructions cause the processor to further perform:

a remaining-amount acquiring step of acquiring a remaining amount of the expendable item attached to the image forming device; and a second-information outputting step of outputting second information when the acquired remaining amount of the expendable item is substantially zero and there is a valid identification stored on the database.

5. The non-transitory computer readable medium according to claim 3, wherein the instructions cause the processor to further perform:

a second-identification transmitting step of, when it is determined in the first identification determining step that the second identification is different from any first identification stored on the database, transmitting the second identification to a second server on the network;

a validity information acquiring step of acquiring validity information from the second server in response to transmission of the second identification, the validity information showing whether the second identification is valid; and a validity determining step of determining whether the second identification is valid, based on the validity information acquired, and wherein the invalid-identification storing step comprises a step of, when it is determined that the second identification is different from any first identification stored on the database and the second identification is invalid, storing the second identification onto the database as an invalid identification.

6. The non-transitory computer readable medium according to claim 1, wherein the instructions cause the processor to further perform:

a used-item identification storing step of, when it is determined in the first identification determining step that the second identification is identical to a first identification stored on the database, storing the second identification onto the database as a used-item identification for identifying a used expendable item.

7. The non-transitory computer readable medium according to claim 6, wherein the instructions cause the processor to further perform:

a second identification determining step of, when it is determined in the first identification determining step that the second identification is different from any first identification stored on the database, determining whether the second identification is identical to a used-item identification stored on the database, and wherein the first-information outputting step comprises a step of outputting the first information when it is determined in the second identification determining step that the second identification is identical to a used-item identification stored on the database.

8. The non-transitory computer readable medium according to claim 1, wherein the instructions cause the processor to further perform:

a third-information outputting step of outputting third information when it is determined in the first identification determining step that the second identification is identical to a first identification stored on the database.

9. The non-transitory computer readable medium according to claim 2, wherein the instructions cause the processor to further perform:

a used-item identification storing step of when it is determined in the first identification determining step that the second identification is identical to a first identification stored on the database, storing the second identification onto the database as a used-item identification for identifying a used expendable item; and a second identification determining step of, when it is determined in the first identification determining step that the second identification is different from any first identification stored on the database, determining whether the second identification is identical to a used-item identification stored on the database, and wherein the first-information outputting step comprises a step of outputting the first information when it is determined in the second identification determining step that the second identification is identical to a used-item identification stored on the database.

10. An information processor communicable with an image forming device, comprising:

an expendable requesting unit configured to transmit, to a first server connected with the information processor via a network, a request for supply of an expendable item for the image forming device;

a first-identification acquiring unit configured to acquire a first identification for identifying the expendable item to be supplied via the first server, which first identification is transmitted by the first server in response to the request;

a first-identification storing unit configured to store the first identification acquired, onto a database;

a second-identification acquiring unit configured to acquire a second identification for identifying an expendable item attached to the image forming device;

a first identification determining unit configured to determine whether the second identification acquired is identical to a first identification stored on the database; and a first-information outputting unit configured to output first information when the first identification determining unit determines that the second identification is different from any first identification stored on the database.

11. The information processor according to claim 10, further comprising:

a second-identification transmitting unit configured to, when the first identification determining unit determines that the second identification is different from any first identification stored on the database, transmit the second identification to a second server on the network;

a validity information acquiring unit configured to acquire validity information of the second identification from the second server in response to transmission of the second identification; and a validity determining unit configured to determine based on the validity information acquired whether the second identification is valid, and wherein the first-information outputting unit is configured to output the first information when the validity determining unit determines that the second identification is invalid.

12. The information processor according to claim 10, further comprising:

an invalid-identification storing unit configured to, when the first identification determining unit determines that the second identification is different from any first identification stored on the database, store the second identification onto the database as an invalid identification.

13. The information processor according to claim 12, further comprising:

a remaining-amount acquiring unit configured to acquire a remaining amount of the expendable item attached to the image forming device; and a second-information outputting unit configured to output second information when the acquired remaining amount of the expendable item is substantially zero and there is a valid identification stored on the database.

14. The information processor according to claim 12, further comprising:

a second-identification transmitting unit configured to, when the first identification determining unit determines that the second identification is different from any first identification stored on the database, transmit the second identification to a second server on the network;

a validity information acquiring unit configured to acquire validity information from the second server in response to transmission of the second identification, the validity information showing whether the second identification is valid; and a validity determining unit configured to determine whether the second identification is valid, based on the validity information acquired, and wherein the invalid-identification storing unit is configured to, when the first identification determining unit determines that the second identification is different from any first identification stored on the database and the validity determining unit determines that the second identification is invalid, store the second identification onto the database as an invalid identification.

15. The information processor according to claim 10, further comprising:

a used-item identification storing unit configured to, when the first identification determining unit determines that the second identification is identical to a first identification stored on the database, store the second identification onto the database as a used-item identification for identifying a used expendable item.

16. The information processor according to claim 15, further comprising:

a second identification determining unit configured to, when the first identification determining unit determines that the second identification is different from any first identification stored on the database, determine whether the second identification is identical to a used-item identification stored on the database, and wherein the first-information outputting unit is configured to output the first information when the second identification determining unit determines that the second identification is identical to a used-item identification stored on the database.

17. The information processor according to claim 10, further comprising:

a third-information outputting unit configured to output third information when the first identification determining unit determines that the second identification is identical to a first identification stored on the database.

18. The information processor according to claim 11, further comprising:

a used-item identification storing unit configured to, when the first identification determining unit determines that the second identification is identical to a first identification stored on the database, store the second identification onto the database as a used-item identification for identifying a used expendable item; and a second identification determining unit configured to, when the first identification determining unit determines that the second identification is different from any first identification stored on the database, determine whether the second identification is identical to a used-item identification stored on the database, and wherein the first-information outputting unit is configured to output the first information when the second identification determining unit determines that the second identification is identical to a used-item identification stored on the database.

19. An image forming device, comprising:

an expendable requesting unit configured to transmit, to a first server connected with the image forming device via a network, a request for supply of an expendable item for the image forming device;

a first-identification acquiring unit configured to acquire a first identification for identifying the expendable item to be supplied via the first server, which first identification is transmitted by the first server in response to the request, the first identification;

a first-identification storing unit configured to store the first identification acquired, onto a database;

a second-identification acquiring unit configured to acquire a second identification for identifying an expendable item attached to the image forming device;

a first identification determining unit configured to determine whether the second identification acquired is identical to a first identification stored on the database; and a first-information outputting unit configured to output first information when the first identification determining unit determines that the second identification is different from any first identification stored on the database.

* * * * *